United States Patent Office 3,291,852
Patented Dec. 13, 1966

3,291,852
ISOBUTANE PRODUCTION
Clark J. Egan, Piedmont, Calif., assignor to Chevron Research Company, a corporation of Delaware
No Drawing. Filed Oct. 25, 1963, Ser. No. 318,803
8 Claims. (Cl. 260—676)

This invention relates to the production of light isoparaffins, more particularly isobutane, by catalytic hydrocracking of higher molecular weight hydrocarbons, such as light distillates.

Isobutane is a desired hydrocarbon or intermediate in the production of many chemical products. Isobutane may be converted into more valuable materials, for example, by alkylation to produce particular higher molecular weight hydrocarbons. Also, the isobutane and the alkylate produced from isobutane are desirable ingredients for gasoline blending. Particularly when the isobutane is to be used in chemical reactions, it is desired to have an isobutane concentrate wherein the amounts of normal butane and iso- and normal-pentane are minimized.

Hydroisomerization of normal butane to isobutane is known to occur in the presence of a halided alumina-supported noble metal catalyst, such as platinum on alumina promoted with aluminum chloride and fluoride. In the hydroisomerization process temperatures of above 350° F. and relatively low pressures of below 800 p.s.i.g. are employed, and the feed is restricted to one which is predominantly butane and contains very little of heavier hydrocarbons, as such heavier hydrocarbons have been thought to be poisonous to the catalyst. In the hydroisomerization process it is possible only to approach an equilibrium iso-to-normal butane ratio from the low side.

Although it has been proposed to hydrocrack pure paraffins containing between 8 and 12 carbon atoms per molecule with the halided hydroisomerization catalysts at pressures of below 500 p.s.i.g., and although a high ratio of isobutane to other products can be obtained in this manner, particularly at very low temperatures of below 450° F., the catalyst fouls rapidly such that process on-stream times of commercial importance are not obtainable. This is similar to effects noted with reforming catalysts. It is usual to promote platinum-alumina reforming catalysts with a small amount of halide, but the amount is carefully limited to avoid hydrocracking which would lead to excessive fouling and catalyst deactivation. At the reforming conditions, temperature above 750° F. and pressure below 800 p.s.i.g., with the platinum-alumina catalyst used, only a minor amount of isobutane is produced.

The process of the present invention produces isobutane selectively from light hydrocarbons containing more than 6 carbon atoms per molecule in a continuous manner, i.e., without significant catalyst fouling or deactivation. The iso-to-normal butane ratio in the products exceeds the theoretical equilibrium ratio. It appears that in the new process back isomerization is prevented because of the heavier hydrocarbons in the feed contacting the catalyst.

In accordance with the invention hydrogen and light hydrocarbons comprising paraffins containing more than 6 carbon atoms to the molecule are passed into contact with a halided alumina-supported noble metal catalyst at a temperature below 700° F. and a hydrogen partial pressure above 1000 p.s.i.a. An isobutane concentrate is then recovered from the hydrocarbons which have been so passed. It is found that at these conditions not only are the light hydrocarbons converted in high yield to isobutane, they are selectively converted to isobutane, and the process can be operated continuously for a long time.

When it is said herein that isobutane is produced in a continuous manner, it is meant that the process is continued until at least 100 pounds of isobutane has been produced per pound of catalyst contacted with the feed prior to regenerating the catalyst. In general the rate at which feed is passed over the catalyst is such that the process is continued for at least 1000 hours. In the carrying out of the process it is found that catalyst deactivation proceeds at a slow rate, which reactivation can be compensated for by increasing the temperature. The rate at which the temperature would have to be increased to maintain the same conversion thus provides a measure of the rate of catalyst fouling or deactivation. In the process of the invention this rate of temperature increase is desirably less than about 0.05° F. per hour initially. Later on, if higher temperatures are used in order to obtain the desired conversion, the rate at which the temperature must be increased may itself increase. However, the initial rate of fouling in the invention is low enough such that the above mentioned on-stream time of at least 1000 hours, or at least until 100 pounds of isobutane has been produced per pound of catalyst, is achieved. On the other hand, it is found that if the initial rate of fouling is above 0.1° F. per hour, the desired continuous operation cannot be achieved.

The continuous operation is made possible in part by the use in combination of low temperatures of below 700° F. and high partial pressures of hydrogen in excess of about 1000 p.s.i.a. It is found that the higher pressure does not adversely affect the selectivity for conversion to isobutane nor the yield of isobutane even at moderately high temperatures below 700° F., including temperatures which would not be usable at lower pressures because of excessive fouling. Thus, because it is possible to operate at moderately high temperatures below 700° F. it is possible to use space velocities in terms of volumes of liquid hydrocarbon feed per volume of catalyst per hour (LHSV), corresponding to the use of reasonable sized reaction vessels and the high flow rates desired in commercial processes.

The process as above described is readily carried out if the feed is a clean mixture of light hydrocarbons comprising paraffins containing more than 6 carbon atoms to the molecule. In what may be a more important embodiment of the invention the feed is an impure light distillate, having a high content of paraffins containing more than 6 carbon atoms to the molecule but also containing other materials as would naturally be present in the case of a light straight-run distillate of paraffinic crude petroleum. Thus, for example, the feed may contain aromatics and polar impurities such as compounds of nitrogen, sulfur, oxygen and like polar compounds. It is found that isobutane can be produced selectively from even such impure distillates in a continuous manner in an embodiment of the invention wherein polar impurities, and in some cases aromatics as well, are removed from the distillate prior to passing into contact with the halided alumina-supported noble metal catalyst. In accordance with this embodiment of the invention hydrogen and the light distillate are passed into contact with a solid reactant for polar impurities and then into contact with a halided alumina-supported noble metal catalyst at a temperature below 700° F. and a hydrogen partial pressure above 1000 p.s.i.a., and an isobutane concentrate is recovered from the distillate that has been so passed. The single preferred reactant for polar impurities comprises an alkali metal, specially sodium, dispersed on a solid porous support. When so passed into contact with the alkali metal together with hydrogen at conditions including a temperature somewhat below but approaching the temperature used in the contacting with the noble metal catalyst, aromatics are hydrogenated, and polar impurities are removed both by hydrogenation and by reaction with the alkali metal. Surprisingly little catalyst fouling or deactivation then occurs in the process. In addition, superior yields and selectivity for isobutane production are obtained. In particular, the selectivity in terms of the production of isobutane rather that isopentane is unusually high as is the selectivity for production of isobutane relative to normal butane and normal pentane.

The isobutane concentrate recovered in the process of the invention comprises at least 25% isobutane, the remainder being other hydrocarbons having between 3 and 6 carbon atoms to the molecule. The concentrate may be conveniently recovered simply by separating the hydrogen and hydrocarbons which have been passed into contact with the halided alumina supported catalyst into a hydrogen gas portion and a hydrocarbon portion, and then distilling the hydrocarbon portion with a cut point between hexane and heptane. The isobutane concentrate thus consists of the hydrocarbon products lower boiling than heptane. This concentrate can be further enriched by distillation to remove propane and/or to separate pentanes and hexanes or even a major portion of the normal butane, thereby obtaining high purity isobutane concentrate. It is of the essence of the invention, however, that if the material effluent of the catalytic reaction were merely separated into hydrogen gas, a light portion containing hydrocarbon between 3 and 6 carbon atoms to the molecule, and a heavy portion composed of all remaining hydrocarbons having more than 6 carbon atoms to the molecule, the aforesaid light portion would be an isobutane concentrate in the sense of containing more than 25% isobutane. Another characteristic of the invention is that the production of isobutane is more than twice as much as the production of isopentane. Also, it is desired that the conversion to isobutane be at least 25%.

The halided alumina supported noble metal catalyst employed in the process contains between about 0.1 and 3.0 weight percent of the noble metal, which is preferably platinum. The halides employed preferably include both chloride and fluoride, the former being in substantial excess of the latter. In particular, the catalyst preferably contains between 2 and 6 weight percent chloride (expressed as Cl) and between 0.01 and 1 weight percent fluoride (expressed as F). A major portion of the chloride may be present as aluminum chloride, in which case the catalyst is essentially a Friedel-Crafts component combined with alumina as a support, and having supported thereon a noble metal such as platinum. Catalysts of this general type and description are known in the art as are a variety of methods of preparing such catalyst, but it does not appear that they have ever been used in the manner of the present invention.

It is essential that hydrogen be employed in the process of this invention, and generally the amount of hydrogen passed into contact with the catalyst with the feed will amount to between 1 and 10 mols of hydrogen per mol of feed. Greater quantities of hydrogen could be used with no ill effects. As mentioned, the conditions at which the hydrogen and light hydrocarbons are contacted with the catalyst include temperatures of below 700° F. and hydrogen partial pressures of above 1000 p.s.i.a. More particularly, the temperature is in the range between 200 and 700° F., and preferably between 300 and 600° F. Although from thermodynamics it would appear that the lowest possible temperature should be used in order to obtain the maximum ratio of isobutane to normal butane, it is found that much better results are obtained, in terms of high conversion rate in combination with high ratio of isobutane to other products in the moderate temperature range of 300–600° F. in the present invention. Thus, in particular, the actual ratio of isobutane to normal butane is far above that calculated from thermodynamic equilibria, in that the conversion of the higher molecular weight paraffins proceeds by a mechanism entirely independent of isomerization, such that the thermodynamic equilibrium is of no practical significance.

A most important operating variable in the invention is the hydrogen partial pressure employed. As mentioned, this is at least 1000 p.s.i.a. and preferably is somewhat higher. Thus, pressures of above 1200 p.s.i.a. of hydrogen are preferably employed, an exemplary pressure being 1400 p.s.i.a. Pressures above 2000 p.s.i.a. can be used, but increase the cost without proportionately increasing selectivity of run length.

The feed to the process of this invention is composed predominantly of light hydrocarbons comprising paraffins having more than 6 carbon atoms per molecule up to 20 carbon atoms, or even higher if the feed is composed essentially of paraffins, free of aromatics and naphthenes. The light hydrocarbon feed should have a high paraffin content to obtain high selectivity. Hydrocarbons having 6 or less carbon atoms to the molecule are quite difficult to convert in the process.

A feed containing between 7 and 12 carbon atoms per molecule may be prepared, for example, by distilling a paraffinic crude petroleum to obtain a straight run distillate boiling from about 200° F. to about 350° F. or slightly higher. Depending on the properties of the crude petroleum the distillate will thus contain naphthenes and aromatics in addition to paraffins. The preferred feeds contain less than 10% aromatics, though the aromatic concentration may be as high as 15% if the aromatics are substantially removed by means of passing into contact with the reactant for polar impurities. Also, being a straight run distillate, the feed will usually contain various impurities including polar compounds. The bulk of such impurities may be removed in a hydrofining step prior to the process of this invention. However, it is found that hydrofining does not remove certain unidentified polar compounds which appear to contribute to fouling and deactivation of halided alumina-supported noble metal catalysts at the process conditions employed in the process of this invention. Consequently, a hydrofined feed should still preferably be passed into contact with the reactant for polar impurities prior to being passed into contact with the noble metal catalyst.

The conditions at which the feed is contacted with the reactant for polar impurities may be substantially the same as the conditions employed in the contacting with the noble metal catalyst or they may be substantially different. Preferably, the hydrogen and paraffin feed is combined and passed into contact with the reactant for polar impurities at substantially the same elevated hydrogen partial pressure employed in the contacting with the noble metal catalyst, but at a somewhat lower temperature. In particular, temperatures in the range 200–500° F. are preferred in order to promote both hydrogenation and reaction.

The following example illustrates marginal operation of the process, at maximum permissible fouling rate, without removal of polar impurities.

EXAMPLE 1

A straight run paraffinic petroleum distillate boiling from 211° F. to 313° F., was employed as the feed. Feed inspections were as follows:

*Table I*

| | |
|---|---|
| Gravity, ° API | 60.4 |
| Aniline point, ° F. | 132.6 |
| Nitrogen, p.p.m. | 0.1 |
| Sulfur, p.p.m. | 12 |
| Oxygen, p.p.m. | 105±10 |

Table I—Continued

Type analysis, volume percent:
- Paraffins _____ 60
- Naphthenes _____ 32
- Aromatics _____ 8

Carbon number distribution, wt. percent:
- $C_6$ (176° F.) _____ 1.4
- $C_7$ (176–214° F.) _____ 34.3
- $C_8$ (214–260° F.) _____ 30.1
- $C_9$ (260–302° F.) _____ 34.2
- $C_{10}$ (302° F.+) _____

ASTM D 86:
- St./5 _____ 211/221
- 10/30 _____ 222/232
- 50 _____ 241
- 70/90 _____ 253/274
- 95/EP _____ 281/313
- Percent recovered _____ 99.5

This feed was dried by contacting with 4 A. molecular sieve (Linde), mixed with 10 volumes of hydrogen per volume of feed, and then passed into contact with a commercially available catalyst composed of 0.36 weight percent platinum, 95 weight percent alumina, 4.4 weight percent Cl and 0.32 weight percent F. The distillate and hydrogen were passed into contact with the platinum catalyst at 1200 p.s.i.g. (1080 p.s.i.a. $H_2$) and 375° F. at a liquid hourly space velocity of 0.35 LHSV. The distillate which had been so passed had the following composition:

Table II

| Component: | Weight percent |
|---|---|
| $C_1$ | 0 |
| $C_2$ | 0 |
| $C_3$ | 4.7 |
| $iC_4$ | 28.4 |
| $nC_4$ | 3.5 |
| $iC_5$ | 9.5 |
| $nC_5$ | 1.7 |
| $C_6$ paraffins | 2.8 |
| Methyl cyclopentane+cyclohexane | 4.2 |
| $C_6-$ | 54.8 |
| $iC_4/C_6-$ | 52.0 |
| $C_7+$ | 45.2 |

The catalyst had been on-stream for about 300 hours when the above sample was taken, and from the rate at which it was necessary to increase the temperature in order to obtain the same 55% conversion, it was determined that the catalyst fouling rate was approximately 0.1° F. per hour. When the run was repeated at 800 p.s.i.g., the rate of fouling was doubled.

A lower fouling rate is obtainab'e if one is willing to accept a lower conversion. Operation at the higher hydrogen partial pressures of this invention is then more advantageous in producing a superior isobutane concentrate, as shown by the following example of marginal operation of the process of the invention at minimum space velocity without removal of polar impurities.

EXAMPLE 2

The same feed in admixture with 17 volumes of hydrogen per volume of distillate was passed into contact with the same platinum catalyst at 1200 p.s.i.g. (1100 p.s.i.a. $H_2$) at 348° F. and a space velocity of 0.17 LHSV. At these conditions the rate of catalyst fouling or deactivation was only 0.05° F. per hour, and the distillate which had been so passed had the following composition:

Table III

| Component: | Weight percent |
|---|---|
| $C_1$ | 0 |
| $C_2$ | 0 |
| $C_3$ | 3.5 |
| $iC_4$ | 27.8 |
| $nC_4$ | 3.1 |
| $C_5$'s | 10.1 |

Table III—Continued

| Component: | Weight percent |
|---|---|
| $C_6$'s | 6.4 |
| $C_7+$ | 49.1 |
| $iC_4/C_6-$ | 54.7 |

The lower fouling rate in the run of Example 2 as compared to Example 1 may be attributed to the use of the lower temperature, with the lower space velocity being needed to maintain the conversion of approximately 50%. In a preferred operation of the invention, it is desired to use substantially higher space velocity. Hence, it would appear necessary to use higher temperatures where the fouling rate would be greatly increased. In the preferred operation of the invention, as shown in the following example, it is found that by first contacting the feed with a reactant for polar impurities an extremely low fouling rate is obtained even at moderately elevated temperatures and high space velocity.

EXAMPLE 3

In this example the same feed as in the preceding examples in admixture with 10 volumes of hydrogen per volume of distillate was passed downflow through a reactor containing two beds. The bottom bed was the aforementioned halided alumina-supported platinum catalyst. The top bed was composed of 11 weight percent sodium on alumina, prepared by placing high surface area alumina in a flask, displacing air therein with nitrogen, adding chunks of metallic sodium, and heating to melt the Na, which rapidly wetted the alumina. The temperature of the hydrogen-distillate mixture at the inlet to the top bed was 450° F., and the material effluent of this bed was then further heated to 562° F. at the inlet to the platinum catalyst bed. The pressure was maintained at 1400 p.s.i.g. (1260 p.s.i.a. $H_2$), and the flow rate of distillate relative to catalyst was 2.2 LHSV. At these conditions the rate of fouling or deactivation of the platinum catalyst was only 0.015° F. per hour, conversion was 80%, and the distillate which had been so passed had the following composition:

Table IV

| Component: | Weight percent |
|---|---|
| $C_1$ | 2.5 |
| $C_2$ | 1.0 |
| $C_3$ | 13.1 |
| $iC_4$ | 29.5 |
| $nC_4$ | 10.0 |
| $iC_5$ | 11.2 |
| $nC_5$ | 3.8 |
| $C_6$'s | 9.8 |
| $C_7+$ | 19.1 |
| $iC_4/C_6-$ | 36.5 |

Better selectivity can be obtained at a lower conversion, if desired.

When the same run was repeated at the same temperature and space velocity, including contacting with the sodium, but at a lower pressure of 800 p.s.i g., the platinum catalyst fouling rate was 0.2° F. per hour. Thus, the surprising result is noted that precontacting the distillate with the sodium greatly reduced the fouling rate of the platinum catalyst at the high hydrogen partial pressure operating conditions employed in the process of the invention, whereas this pretreatment did not improve the operation at the lower pressure of 800 p.s.i.g.

The propane produced in Example 3 is a desirable by-product for use in liquefied petroleum gas, and in most cases it would be separately recovered. Also, since the $C_6$ hydrocarbons are mostly cyclohexane and methyl cyclopentane, they are desirably separately recovered in many cases. There is then obtained an isobutane concentrate which is more than 50% isobutane. In the practice of the invention this is a characteristic of the $C_4$–$C_5$ product cut. At low flow rate (space velocity) even a $C_3$–$C_6$ product cut can contain 50% or more isobutane.

From the foregoing it is apparent that the process of the present invention achieves the desired advantages of producing selectively isobutane by conversion of hydrocarbons containing more than 6 carbon atoms to the molecule, that it makes possible the conversion in a continuous manner with a very slow rate of catalyst fouling or deactivation, and that a principal feature of this new process is the use of high hydrogen partial pressures of above 1000 p.s.i.a.

What is claimed is:

1. The process for producing selectively isobutane from light distillates in a continuous manner, which comprises passing hydrogen and a light distillate into contact with a reactant for polar impurities and then into contact with a halided alumina-supported noble metal catalyst containing from 2 to 7 weight percent halogen, at a temperature below 700° F. and a hydrogen partial pressure above 1000 p.s.i.a., and recovering an isobutane concentrate from the distillate which has been so passed.

2. The process of claim 1 wherein said hydrogen partial pressure is at least 1200 p.s.i.a.

3. The process of claim 1 wherein said temperature is between 250° F. and 600° F.

4. The process of claim 1 wherein said reactant for polar impurities comprises an alkali metal dispersed on a porous support.

5. The process of claim 1 wherein said distillate is a straight run distillate of paraffinic crude petroleum boiling between about 200° F. and about 350° F.

6. The process for producing selectively isobutane from light distillates in a continuous manner, which comprises passing hydrogen and light hydrocarbon distillate comprising predominantly paraffins containing more than 6 carbon atoms to the molecule, into contact with sodium dispersed in a porous support and then into contact with a catalyst comprising between 0.1 and 3.0 weight percent platinum on alumina and containing between 0.01 and 1.0 percent fluoride and between 2 and 6 weight percent chloride, at a temperature below 700° F. and a hydrogen partial pressure above 1000 p.s.i.a., and recovering an isobutane concentrate from the distillate which has been so passed.

7. The process of claim 6 wherein hydrogen and light distillate are passed into contact with sodium and said catalyst at a flow rate of distillate relative to catalyst slow enough so that at least 25% of said distillate is converted to isobutane.

8. The process of claim 6 wherein hydrogen and light distillate are passed into contact with sodium and said catalyst at a flow rate of light distillate relative to catalyst slow enough so that the isobutane concentrate recovered contains at least 50% isobutane.

References Cited by the Examiner

UNITED STATES PATENTS 3,046,317   7/1962   Myers _____ 260—676

ALPHONSO D. SULLIVAN, *Primary Examiner.*